United States Patent Office 3,205,200
Patented Sept. 7, 1965

3,205,200
TRIARYL CYANURATE POLYMERIC
COMPOSITION
Wilhelm Bunge and Otto Bayer, Leverkusen, Germany, assignors to Farbenfabriken Bayer Aktiengesellschaft, Leverkusen, Germany, a corporation of Germany
No Drawing. Filed July 31, 1959, Ser. No. 830,737
Claims priority, application Germany, Aug. 4, 1958,
F 26,318
8 Claims. (Cl. 260—75)

This invention relates to organic compounds and polymers thereof containing inter alia cyanurate groups and more particularly to said compounds and polymers containing cyanurate groups which may be advantageously employed as coatings, molding compounds and the like, either alone or in conjunction with other reactive compounds.

Compounds containing cyanurate groups,

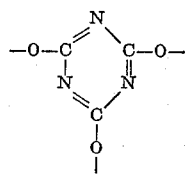

wherein the free valence is through a free oxygen atom to an organic radical are to be distinguished from compounds containing isocyanuric acid ring structures.

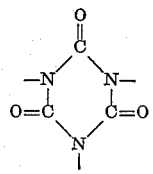

wherein the free valence is through the nitrogen atom to an organic radical. The isocyanuric acid ring structures can be formed by polymerization of isocyanates whereas the cyanurates which are the subject of the present invention result from the reaction of a cyanuric halide, such as cyanuric chloride with an hydroxyl radical such as the hydroxyl radical of phenol.

It has been proposed heretofore to react alkoxy-s-triazines with alcohols having a higher boiling point than the alkoxy radical in the presence of sodium to displace said alkoxy radical by transesterification to form allkyl cyanurates. For example, beta hydroxyethyl cyanurate may be obtained by heating trimethyl cyanurate to about 110° C. with an excess of ethylene glycol in the presence of sodium methylate. It is also known to prepare polyammelide esters from either unsubstituted or nitrogen-substituted amino dialkyl-s-triazines and alkylene glycols such as diethylene glycol, triethylene glycol, polyethylene glycol, hexamethylene glycols and the like in the presence of 4 to 10 mol percent of sodium. The polyammelides obtained, for example, from 6-amino-s-triazine-2,4-diol and a polyethylene glycol in the form of the alcohol constitute syrupy, rubbery and even hard, brittle resins depending on the compounds used and the proportions of said compounds. The formation of the polyammelide is dependent upon the presence of sodium and consequently the products have not proven useful commercially because of the difficulty experienced in separating the sodium from the polymeric product and the consequent unsatisfactory electrical conductivity, storage stability, luster and elasticity of the products, if the sodium is not removed.

It is an object of this invention to provide compounds containing cyanurate groups and polymers thereof. Another object of this invention is to provide compounds containing cyanurate groups which have improved physical properties. Still another object of this invention is to provide a process for the preparation of polymeric compounds containing cyanurate groups which have good dielectric properties. Another object of this invention is to provide a process for the preparation of compounds containing cyanurate groups. A further object of this invention is to provide improved polyurethane plastics containing cyanurate groups and a process for the preparation thereof.

The foregoing objects and others which will become apparent by the following description are accomplished in accordance with the invention, generally speaking, by providing compounds containing cyanurate groups obtained from aryl cyanurates and organic compounds containing at least two active hydrogen containing groups either alone or in conjunction with an organic polyisocyanate. Thus, this invention contemplates compounds containing cyanurate groups obtained from triaryl cyanurates and organic compounds containing at least two alcoholic hydroxyl groups which may be polymerized alone or further reacted with an organic polyisocyanate to produce a polyurethane plastic. In other words, it has been found that triaryl cyanurates having the formula:

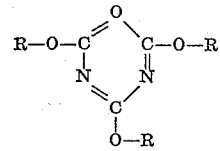

wherein R is aryl or alkaryl, may be reacted with an organic compound containing at least two alcoholic hydroxyl groups to prepare plastics containing cyanurate groups which have improved physical properties. According to a preferred embodiment of the invention the reaction between the triaryl cyanurate and the organic compounds containing at least two alcoholic hydroxyl groups is interrupted at a point where side chains from the triaryl cyanurate exist which contain active hydrogen-containing groups suitable for reaction with an isocyanate group to prepare a polyurethane plastic and are thereafter reacted with an organic polyisocyanate by the polyisocyanate addition process to yield polyurethane plastics. If the initial reaction is allowed to proceed to completion under the action of heat, either soluble or insoluble compounds containing cyanurate groups may be obtained, depending on the character of the hydroxyl containing component.

Any suitable triaryl cyanurate as more particularly defined above and containing aryl or alkaryl side chains or mixtures thereof may be used. Any suitable aryl group such as, for example, phenyl, p-phenyl-phenylene, naphthyl and the like or mixtures thereof may be used. Any suitable alkaryl radical may be used, such as, for example, tolyl, xylyl, mesityl, p-tertiary-butyl-phenylene, indenyl, p-toluylene-phenylene and the like.

Any suitable organic compound containing at least two active hydrogen-containing groups and preferably containing predominantly alcoholic hydroxyl groups may be used for reaction with the triaryl cyanurates to prepare the compounds and polymers of this invention such as, for example, polyhydroxyl alcohols, polyhydric polyalkylene ethers, hydroxyl polyesters, polyhydric polythioethers, polyacetals and the like.

Any suitable polyhydroxyl alcohol may be used such as, for example, ethylene glycol, butylene glycol, 1,6-hexanediol, 2,2-dimethyl-1,3-propane diol, 1,4-butane diol, 1,4-butyne diol, glycerine, trimethylol propane, 1,3, 6-hexanetriol, diethanolamine, triethanolamine, castor oil, pentaerythritol, N,N,N',N'-tetrakis(2-hydroxy propyl)-ethylene diamine and the like. Polyhydroxyl alcohols having from 2 to 4 hydroxyl groups are preferred as set forth above but one may also use polyhydroxyl alcohols having more than 4 hydroxyl groups such as, for example, polyvinyl alcohol, polyvinyl butyral, polyvinyl formal and the like.

Any suitable polyhydric polyalkylene ether may be used such as, for example, the condensation product of an alkylene oxide with a small amount of an active hydrogen-containing compound such as water, ethylene glycol, propylene glycol, butylene glycol, amylene glycol, trimethylol propane, glycerine, pentaerythritol and the like. Any suitable alkylene oxide may be used such as, for example, ethylene oxide, propylene oxide, butylene oxide, amylene oxide and the like. The polyhydric polyalkylene ethers preferably have from 2 to 4 hydroxyl groups and may be prepared by any known process such as, for example, the process described by Wurtz in 1859 and in "Encyclopedia of Chemical Technology," volume 7, pages 257 to 262, published by Interscience Publishers, Inc., 1951, or in U.S. Patent 1,922,459.

Any suitable hydroxyl polyester may be used such as, for example, the reaction product of a polycarboxylic acid and a polyhydric alcohol. Any suitable polycarboxylic acid may be used such as, for example, oxalic acid, adipic acid, methyl adipic acid, sebacic acid, fumaric acid and the like, as well as sulfur containing acids such as, thiodiglycolic acid, thiodipropionic acid and aromatic acids such as phthalic acid, isophthalic acid, terephthalic acid, 1,2,4-benzene-tricarboxylic acid and citric acid or mixtures thereof. Any suitable polyhydric alcohol may be used such as, for example, ethylene glycol, propylene glycol, butylene glycol, trimethylol propane, pentaerythritol and the like.

Any suitable polyhydric polythioether may be used, such as, for example, the reaction product of one of the aforementioned alkylene oxides used in the preparation of the polyhydric polyalkylene ethers with a polyhydric thioether such as, for example, thiodiglycol and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any suitable polyhydric alcohol may be used such as, for example, ethylene glycol, propylene glycol, butylene glycol, trimethylol propane, pentaerythritol and the like.

Of course, it is also possible to use one of the aforementioned types of compounds which contain only one hydroxyl group for the preparation of compounds which will react with organic polyisocyanates. In other words, one may use compounds containing at least one hydroxyl group and containing additional groups having active hydrogen atoms such as, for example, primary and secondary amino groups, activated methylene groups, carboxylic acid groups and the like in the first step to prepare a compound having hydrogen atoms reactive with an isocyanate group by reaction of the hydroxyl group with the triaryl cyanurate and subsequently react this compound with a polyisocyanate to prepare a polyurethane or polyurea type polymer. Any suitable compound containing an hydroxyl group and an amino group may be used, such as, for example, the reaction product of 2 mols of propylene oxide with 1 mol of ethylene diamine, 1-amino-6-hydroxy-hexamethylene, p-hydroxy-aniline and the like. Any suitable compound containing activated methylene groups, in addition to an hydroxyl group may be used such as, for example, methyl-beta-hydroxyl ethyl ketone and the like. Any suitable compound containing a carboxylic acid in addition to the hydroxyl group may be used as, for example, 3-hydroxy-butyric acid and the like. Compounds containing more than one group in addition to the hydroxyl group may also be used such as, for example, beta-hydroxy-glutamic acid and the like.

In the preparation of any of the foregoing organic compounds containing at least two active hydrogen-containing groups, it is also possible to include subordinate quantities of diamines, monocarboxylic acids and monoalcohols such as, for example, ethylene diamine, benzoic acid and ethanol respectively.

Where polyisocyanates are employed in the process of the present invention, it is to be understood that any suitable organic compound containing two or more free isocyanate groups is contemplated. Any suitable organic polyisocyanate may be used such as, for example, tetramethylene diisocyanate, hexamethylene diisocyanate, thiodipropyl diisocyanate, ω,ω'-diisocyanato-dialkyl benzenes such as, for example, 1,3-di-2-isocyanato-ethyl-benzene, 1,5 - naphthalene diisocyanate, 1,3 - diisocyanato-cyclohexane, 2,4-toluylene diisocyanate, 2,6-toluylene diisocyanate and mixtures thereof, p,p'-diphenyl methane diisocyanate, 3-alpha-isocyanto-ethyl-phenyl-isocyanate and p,p',p''-triphenyl methane triisocyanate as well as diphenyl sulphone polyisocyanates such as, 1,6-diphenyl sulphone diisocyanate and the like. It is also possible to use as the isocyanate-containing compound a so-called masked or polymerized isocyanate such as, for example, the reaction product of an isocyanate with a monoalcohol such as methanol, ethanol, propanol and the like, a phenol such as cresol and the like, an amine such as ethyl amine and the like, as well as other masked isocyanates more particularly disclosed in U.S. Patent 2,881,990. One may also use adduct-containing polymerization products of isocyanates wherein the polymers are polymerized through the isocyanate groups such as, for example, a polymerization product of the reaction product of 3 mols of ethanol with 3 mols, 2,4-toluylene diisocyanate having the formula:

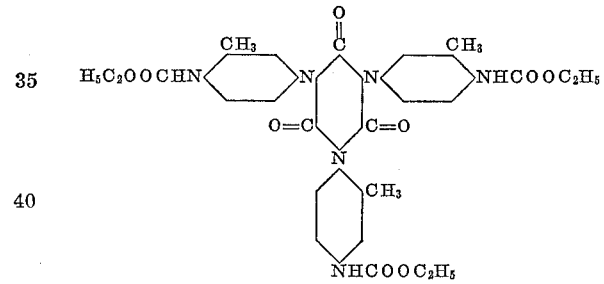

Compounds of this type are more particularly described in copending application Serial No. 651,137. Other suitable polyisocyanates and substances which yield isocyanate of the type contemplated for the practice of the present invention are disclosed in German Patents 1,035,362 and 1,013,869.

The reaction conditions, such as the time for which the reactants are allowed to remain in contact and the temperatures employed are not critical, but in the interest of shortening the reaction time it is preferred to carry out the reaction between the triaryl cyanurates and the organic compounds containing at least two active hydrogen containing groups at temperatures above about 150° C. and, most preferably within the range of from about 150° C. to about 250° C. At these temperatures the aryloxy radical separates from the cyanurate ring leading to phenolic by-products in the reaction mixture. The phenolic by-products formed may either be distilled off at ordinary pressures or under a partial vacuum or they may be allowed to remain in the reaction mixture. It is also possible to carry out the reaction between the aryl cyanurate and the organic compound containing at least two active hydrogen containing groups in the presence of a solvent. Any suitable solvent may be used but it is preferred to use an organic solvent such as, for example, xylene, orthodichlorobenzene phenol, cresol and the like. When solvents are employed the corresponding aryl compound of the triaryl cyanurate is desirable. In other words, if tricresol cyanurate is employed, it is desirable to carry out the reaction in the presence of cresol. It is also advantageous in carrying out the process of the present invention wherein the triaryl cyanurate is reacted with an organic compound containing at least two active hydrogen-containing groups to employ a catalyst to increase the speed of the transesterification reaction. Any suitable catalyst may be used but it is preferred to employ compounds such as, for example, lead oxide, lead acetate, zinc acetate, zinc octoate, titanium tetrabutylate as well as soluble compounds of tin, molybdenum, and/or iron such as dibutyl tin dilaurate, ferric acetonyl acetate, and molybdenum glycolate. Catalytic amounts of the catalyst are contemplated, preferably within the range of from about .01 to about 0.2 percent by weight and most preferably about 0.1 percent by weight. Catalysts which are difficult to separate from the final product, such as sodium, are to be avoided. If desired, the course of the transesterification reaction can be followed either by measuring the amount of the phenolic compound given off or by measuring the viscosity of the reaction mixture.

Where desirable, the transesterification reaction can be interrupted at an intermediate stage prior to complete cross-linking to yield a compound having terminal groups containing active hydrogen atoms which is suitable for reaction with an organic polyisocyanate by the polyisocyanate addition process to form polymeric plastics. Any suitable reaction conditions, times, temperatures, and the like may be employed in this process. Suitable reaction conditions for the process may be found in U.S. Patent 2,729,618 and Reissue Patent 24,514 together with proper apparatus for carrying out the invention.

A preferred embodiment of the invention involves the preparation of a coating composition by reaction of the triaryl cyanurate with about 3 mols of a polyhydroxyl alcohol having a higher boiling point than the aryl component in a first step at a temperature above about 150° C. and preferably within the range of from about 150° to about 250° C., to prepare an hydroxyl terminated intermediate polymer suitable for reaction with an organic polyisocyanate to prepare a polyurethane plastic and subsequently mixing said intermediate with an organic polyisocyanate and applying the combined components to a support where they are stoved at relatively elevated temperatures of above about 150° C. and preferably at a temperature within the range of from about 180° to about 300° C. Since further heating of the intermediate hydroxyl terminated compound would produce a cross-linked plastic with excellent properties in the absence of an organic polyisocyanate, the amount of the organic polyisocyanate is not critical. It is preferred, however, to employ an excess of the organic polyisocyanate based on the reactive hydroxyl groups of the polyhydroxyl intermediate to prepare a highly crosslinked plastic which has good elasticity, thermal stability and dielectric properties. The practice of the invention has proved particularly advantageous in the wire coatings field. In other words, the coatings not only have good elastic and thermal properties, but have good dielectric properties as well. Further, the coatings may be removed by simply dipping the coated wire into molten tin and are thereby rendered ready for soldering in a simple and convenient manner.

Coating solutions which are particularly advantageous for application to metal supports may be prepared in accordance with the invention. The coatings produced by this process are firmly adhering, solvent resistant coatings which may be stoved for brief periods of time of 10 minutes or less to obtain a satisfactory coating. The products of the invention may also be used to prepare shaped articles such as gears and the like or they may be used for the encapsulation of fragile or electrically conductive articles such as capacitors, transistors and the like. In their use, the coatings may be applied by brushing, dipping, spreading with a knife or by any other suitable means.

The invention may be further illustrated by the following specific embodiments in which the parts are by weight.

*Example 1*

About 184 parts of cyanuric chloride and about 356 parts of a technical cresol mixture are gradually heated to about 210° C. while stirring until the initially violent hydrochloric acid development is completed. After passing nitrogen through, there are left about 431 parts of a 92.6 percent solution of tricresyl cyanurate in cresol.

About 762 parts of bis-ethylene-glycol terephthalate are introduced, while stirring, into the hot solution of the starting material obtained in this way and the homogeneous solution is further heated to about 200° C. under water jet vacuum. In the course of about 4 hours, about 134 parts of cresol are distilled off. The residue is a resin which is brittle in the cold state, and the 35% cresol solution of which has a viscosity of about 1040 cp./25° C.

If this solution is applied as lacquer to supports such as a sheet iron or copper wire and is heated for a few minutes at about 280° C. firmly adhering coatings of high lustre are formed, these coatings having a good elasticity and remarkable dielectric properties as well as good thermal stability.

About 100 parts of the resin containing hydroxyl groups and about 100 parts of a substance splitting off isocyanate, obtained by condensation of about 3 mols of toluylene diisocyanate with about 1 mol of trimethylol propane followed by subsequent masking of the free isocyanate groups with about 3 mols of phenol, can also be dissolved in about 250 parts of cresol to obtain a lacquer solution. The lacquer solution is applied in the usual manner, for example to copper wires, and hardened at about 250° C. A lacquer coating resistant to mechanical and chemical influences is formed, the said coating being characterized by good electrical properties and having a capacity for ready soldering by dipping into molten tin.

*Example 2*

About 138 parts of a polyester with about 12.3 percent of —OH groups and obtained by vacuum esterification from about 3 mols of adipic acid and about 4 mols of trimethylol propane are added to about 144 parts of the 92.6 percent cresol solution of the tricresyl cyanurate described above in Example 1. About 1 part of zinc octoate and about 81 parts of cresol are added and the mixture is heated while stirring for several hours to about 190° C., the viscosity of the cresol solution constantly increasing. After this solution has been applied to metal supports and after being heated for about 10 minutes at about 280° C., it provides very firmly adhering coatings which are resistant to solvents.

*Example 3*

Approximately the following parts of the components, 216 parts of tricresyl cyanurate (92.6 percent in cresol),
80 parts of bis-hydroxyethylated-4,4'-dihydroxy-diphenyl dimethyl methane,
254 parts of bis-ethylene glycol terephthalate,
0.125 part of lead oxide,
1.25 parts of zinc octoate solution, 60% in gasoline, and
193 parts of crude cresol, are heated in a nitrogen atmosphere under reflux and while stirring for about 18 hours to about 200° C. The solution obtained has a viscosity of about 305 cp./75° C. Applied as a lacquer to supports, it quickly yields solvent-resistant films with a high resistance to scratching and temperature after being stoved at temperatures of about 250° C.

*Example 4*

Approximately the following parts of the components, 216 parts of tricresyl cyanurate (92.6 percent in cresol),
12 parts of glycerine,
13 parts of 2,2-dimethyl-1,3-propanediol,
254 parts of bis-ethylene-glycol terephthalate,
0.125 part of lead acetate, and
137 parts of a technical cresol mixture, are heated for about 16 hours under reflux at about 200° C. to about 210° C. The cresol solution is still clear, even after standing for a relatively long time in the cold, and is suitable for the manufacture of stoving lacquers which have high resistance to temperature as well as good mechanical strength properties on being stoved at temperatures of about 250° C.

*Example 5*

About 178 parts of triphenyl cyanurate prepared by reacting cyanuric chloride with phenol, are melted with about 381 parts of bis-ethylene-glycol terephthalate and about 13 parts of ethylene glycol and heated to about 200° C. After applying a vacuum of about 150 to about 160 mm. Hg, about 139 parts of phenol are split off in the course of about 4 hours. A resin which is brittle at room temperature is obtained, the solution of this resin in m-cresol quickly yielding a very bright, elastic and solvent-resistant coating after being applied to metal supports and stoved at about 250° C.

*Example 6*

About 431 parts of tricresyl cyanurate (92.6 percent in cresol) are heated with about 932 parts of castor oil and about 0.4 part of lead oxide, as well as about 4.0 parts of zinc octoate (60 percent in gasoline) to about 200° C. and treated for about 8 hours at about 15 mm. Hg while stirring. About 220 parts of cresol distill off, corresponding to about 58 percent conversion. The thick oily condensation product is completely soluble in any proportion in gasoline, benzene, or toluene. If this solution is applied to metal supports, a lacquer film which is no longer soluble in the solvents mentioned above is formed in about 15 minutes after stoving at about 260° C.

Although only some of the above disclosed reactants, catalysts, solvents and the like were employed in the foregoing specific embodiments, it is to be understood that any other suitable reactant, catalyst and/or solvent could have been used with equally satisfactory results.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A polymer prepared by a process which comprises reacting a triaryl cyanurate with a polyhydric alcohol at a temperature of at least about 150° C.

2. A polymer prepared by a process which comprises reacting triaryl cyanaurate with at least about three mols of a polyhydric alcohol per mol of said triaryl cyanurate at a temperature of at least about 150° C.

3. A polymer prepared by a process which comprises reacting tricresyl cyanurate with a polyhydric alcohol at a temperature of at least about 150° C.

4. A polymer prepared by a process which comprises reacting at a temperature of at least about 150° C., a triaryl cyanurate with at least about three mols of an hydroxyl polyester per mol of said triaryl cyanurate, said hydroxyl polyester having been prepared by a process which comprises reacting an excess of a polyhydric alcohol with a polycarboxylic acid.

5. A polymer prepared by a process which comprises reacting at a temperature of at least about 150° C., a triaryl cyanurate with an hydroxyl polyester prepared by a process which comprises reacting an excess of a polyhydric alcohol with a phthalic acid.

6. A coating composition prepared by a process which comprises reacting a triaryl cyanurate in a first step with a polyhydric alcohol at a temperature of at least about 150° C. to prepare a polymer having free hydroxyl groups and reacting the resulting polymer with an organic polyisocyanate.

7. A coating composition prepared by a process which comprises reacting at a temperature of from about 150 to about 250° C., triaryl cyanurate in a first step with at least about three mols per mol of said triaryl cyanurate, of an hydroxyl polyester prepared by a process which comprises reacting an excess of a polyhydric alcohol with a polycarboxylic acid to prepare a polymer having free hydroxyl groups and reacting the resulting polymer with an organic polyisocyanate.

8. The coating composition of claim 7 wherein said polyhydric alcohol for reaction with said triaryl cyanurate is a polyester prepared by a process which comprises reacting a polyhydric alcohol with a phthalic acid.

References Cited by the Examiner

UNITED STATES PATENTS

| 2,822,349 | 2/58 | Muller et al. | 260—77.5 |
|---|---|---|---|
| 2,838,511 | 6/58 | Kogon | 260—77.5 |
| 2,907,745 | 10/59 | Greenlee | 260—77.5 |
| 2,935,487 | 5/60 | Fox et al. | 260—33.4 |
| 2,971,942 | 2/61 | Masters et al. | 260—248 |

FOREIGN PATENTS

| 1,013,869 | 8/57 | Germany. |
|---|---|---|
| 1,035,362 | 7/58 | Germany. |
| 809,809 | 3/59 | Great Britain. |

OTHER REFERENCES

Thurston et al.: "Journal of the American Chemical Society," volume 73, July 6, 1951, No. 7, page 2991.

Thurston et al.: Journal of the American Chemical Society, vol. 73, July 6, 1951, No. 7, pages 2992–3008.

MORRIS LIEBMAN, *Primary Examiner.*

DANIEL ARNOLD, LEON J. BERCOVITZ, ALEXANDER H. BRODMERKEL, *Examiners.*